United States Patent
Kenji

[19]

[11] Patent Number: 5,350,295
[45] Date of Patent: Sep. 27, 1994

[54] METHOD FOR PRODUCING DIFFERENT KINDS OF HEAT-TREATED PRODUCTS

[75] Inventor: Takeuchi Kenji, Itami, Japan

[73] Assignee: Sumitomo Electric Industries, Ltd., Osaka, Japan

[21] Appl. No.: 965,254

[22] PCT Filed: May 27, 1992

[86] PCT No.: PCT/JP92/00703

§ 371 Date: Jan. 26, 1993

§ 102(e) Date: Jan. 26, 1993

[87] PCT Pub. No.: WO92/21926

PCT Pub. Date: Dec. 10, 1992

[30] Foreign Application Priority Data

May 29, 1991 [JP] Japan .................. 3-126201

[51] Int. Cl.$^5$ .................................. F27D 5/00
[52] U.S. Cl. ............................. 432/5; 432/121; 432/126; 432/153
[58] Field of Search ............ 432/121, 122, 126, 128, 432/153, 162, 261, 5, 6

[56] References Cited

U.S. PATENT DOCUMENTS

| | | | |
|---|---|---|---|
| 4,033,715 | 7/1977 | Beck | 432/153 |
| 4,421,481 | 12/1983 | Holz et al. | 432/126 |
| 4,820,150 | 4/1989 | Ushijima | 432/121 |
| 4,834,649 | 5/1989 | Levit et al. | 432/121 |

*Primary Examiner*—Henry C. Yuen
*Attorney, Agent, or Firm*—Wenderoth, Lind & Ponack

[57] ABSTRACT

A method for producing a plurality of kinds of heat-treated products economically and efficiently and with minimum sorting errors, using fewer number of heating devices than pre-treatment and post-treatment devices. Pre-treatment devices (e.g., compacting machines) and post-treatment devices (e.g., sizing presses and finishing devices) are provided upstream and downstream of the sintering furnace. Also provided is a carrier device comprising a carrier conveyor, a return conveyor and loading/unloading devices. A first transfer device and a second transfer device are provided between the entrance of the furnace and the conveyor and between the outlet of the furnace and the conveyor, respectively. Each heat-resistant tray carrying products (works) and supported on a corresponding carrier case is removed from the case and fed into the sintering furnace. The empty cases are put back on the conveyor and transported separately from the trays. The heat-resistant trays, having been heat-treated in the furnace, are put back into the corresponding cases and fed to the post-treatment device by the conveyor.

6 Claims, 3 Drawing Sheets

METHOD FOR PRODUCING DIFFERENT KINDS OF HEAT-TREATED PRODUCTS

TECHNICAL FIELD

The present invention relates to a method for effectively and simultaneously producing different kinds of products to be heat-treated such as sintered parts.

BACKGROUND ART

In producing different kinds of sintered products simultaneously, one way to improve the productivity is to connect a compacting step to be carried out before heating, with a heating (sintering) step. Specific ways to make such a connection include 1) coupling one compacting machine with one sintering furnace via a chute, 2) loading parts (hereinafter referred to as works) on a work carrier means (such as a mesh belt) in a continuous heating device such as a mesh belt type furnace, keeping sufficient spaces between different types of works, or 3) putting different kinds of works together on a single tray, supplying the tray into a sintering furnace, and sorting them manually after heat-treatment.

The method 1) requires the same number of sintering furnaces as the number of types of works to be heat-treated and thus is costly. Also, since the works have to be fed directly into the sintering furnaces one by one, it is difficult to automate the mechanism for taking the works out of the furnaces and thus to feed the works efficiently to the subsequent steps.

In the method 2), works are fed, keeping the spaces for sorting between different types. This will lower the energy efficiency of the heating device. Also, lightweight or unstable works may move on the carrier means and mix into a group of works of a different kind.

The method 3), in which different kinds of works are placed in a single tray and processed in a batch, includes the manual sorting step, Thus, sorting errors are unavoidable and the working efficiency is no good.

A chief object of this invention is to solve these problems.

In an arrangement where a single heating device is used for producing different kinds of works, there may arise an imbalance between the throughput capacity of the heating device and that of the front and/or rear step. Heretofore, it was necessary to stop the front and/or rear step until such an imbalance disappears. This lowers the working efficiency of the apparatus. Another problem of conventional apparatuses is that the conveyors and chutes connecting the adjacent steps tend to interfere with the work operation and thus lower the working efficiency.

A second object of this invention is to solve these problems.

DISCLOSURE OF THE INVENTION

In order to attain the above-mentioned chief object, method of producing different kinds of heated products according to the present invention is carried out, using a facility comprising a heating device for heat treating works while feeding them from its entrance to outlet, a plurality of pre-treatment and post-treatment devices provided, respectively, upstream and downstream of the heating device, a case carrier device having a main carrier line extending along the devices, a first transfer device provided between the carrier device and the entrance of the heating device, and a second transfer device provided between the carrier device and the outlet of the heating device.

This method comprises the steps of putting a plurality of kinds of works fed from the pre-treatment device in a plurality of heat-resistant trays with each tray carrying the same kind of works, setting the heat-resistant trays in carrier cases each having a marking for showing the kind of works carried by the respective tray, moving each carrier case by the carrier device to a point near the heating device, separating each heat-resistant tray from the respective carrier case by means of the first transfer device, feeding each tray into the heating device while moving the tray-free carrier cases toward the second transfer device by the carrier device, putting each heat-resistant tray coming out of the heating device back into the carrier case by the second transfer device, moving the carrier cases now carrying the trays further ahead by the carrier device, sorting the cases according to the markings on the cases, and feeding the cases thus sorted to the post-treatment device.

As will be described in the description of preferred embodiments, this method can be carried out more efficiently by connecting a plurality of heating devices to the pre-treatment and post-treatment devices through the distributing device and the collecting device of the carrier device.

The problem of operation loss due to imbalance in capacities between the furnace and the pre-treatment and post-treatment devices can be solved by providing case stockers mounted between the adjacent devices and connected to the carrier device through case transfer means. Namely, with this arrangement, any oversupplied works can be temporarily stored in the stockers together with the respective carrier cases and heat-resistant trays.

Another problem of the conventional structure is that the carrier device provided in the way of the work line tends to lower the working efficiency. In order to solve this problem, the carrier device may be made up of a conveyor as a carrier line provided over the work line, and a loading device for loading and unloading the carrier cases onto and from the overhead conveyor.

Each heat-resistant tray carrying works is separated from the carrier case and fed into a heating device and is brought back into the original carrier case after heat treatment. Thus, different kinds of works can be heat-treated with a single heating device as far as their heating conditions are the same.

Since each tray carries a single kind of works, no mixup with different kinds of works will happen. Also, this arrangement eliminates the necessity to keep a wide space between different groups of works, which was heretofore necessary for sorting, Thus, the energy efficiency is high.

Further, since all the devices are connected together with a single case carrier device, the works can be fed automatically and efficiently from one step to another. This improves the working efficiency of the facility and thus its productivity.

Also, by providing case stockers between the adjacent stations, any oversupplied works can be temporarily stored therein. This makes it possible to adjust any imbalance in throughput capacities between the respective stations. Thus, there is no need of stopping any device on the supply side.

Also, the carrier line of the carrier device may be provided overhead so that the work line may not be interrupted by the carrier line. This improves the working efficiency.

BEST MODE FOR EMBODYING THE INVENTION

Figure 1:
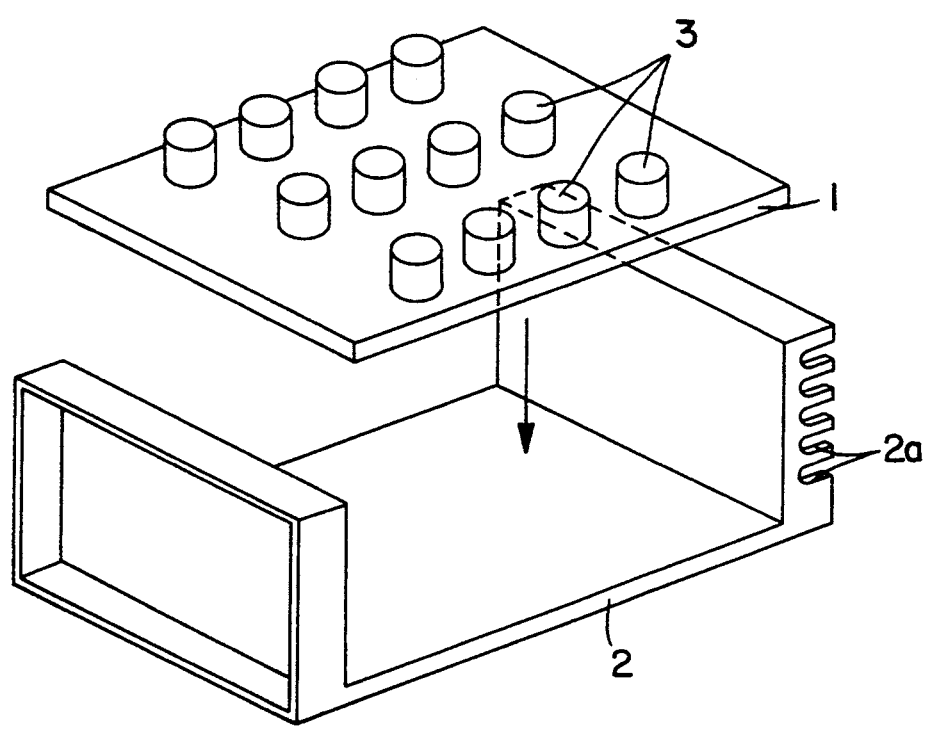
FIG. 1 is a perspective view showing one example of a heat-resistant tray and a carrier case used for the method according to this invention.

FIG. 1 shows a heat-resistant tray 1 and a carrier case 2 used for the method according to this invention. The carrier case 2 comprises a base plate for supporting the heat-resistant tray 1 and side walls extending vertically upward from both ends of the base plate and having recesses for engaging hooks. Each side wall is provided with markings 2a (which are slits in the illustrated embodiment but not limited thereto) for distinguishing the kinds of works. The heat-resistant tray 1 is put in the carrier case 2 with works 3 placed on the tray 1 and carried together with the case at locations other than the heating location.

Figure 2:
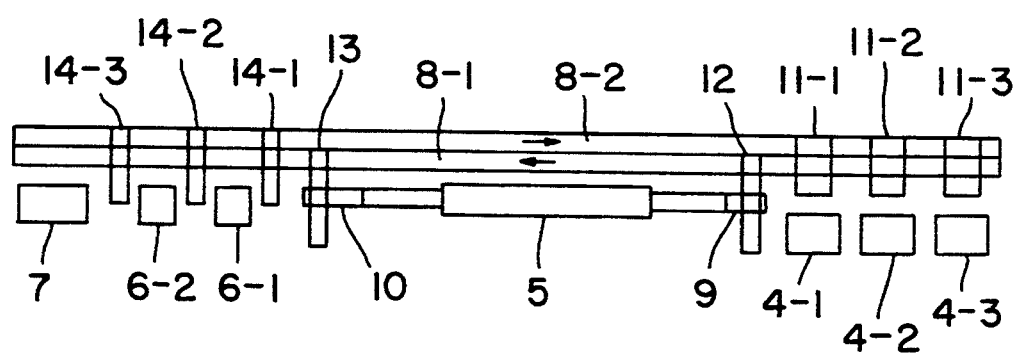
FIG. 2 is a plan view showing one embodiment of a layout of the production facility for carrying out the method according to this invention.
Figure 3:
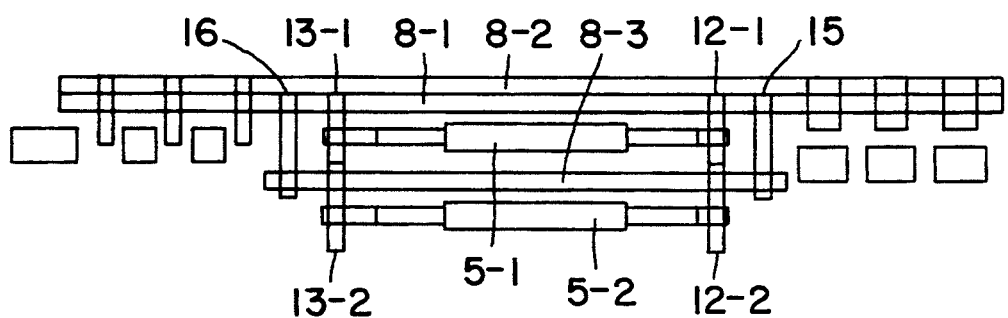
FIG. 3 is a plan view showing another embodiment of a layout of the production facility for carrying out the method according to this invention.

FIGS. 2 and 3 show examples of layouts of production facility for carrying out the method of this invention. They are used to produce ferrous sintered parts. The apparatus shown in FIG. 2 comprises one heating device (sintering furnace) and three pre-treatment devices and three post-treatment devices. Namely, this apparatus has a pre-treatment device comprising compacting machines 4-1, 4-2 and 4-3, a sintering furnace 5 provided at the back of the pre-treatment device, and a post-treatment device comprising two sizing presses 6-1 and 6-2 and a finishing device 7, which are located behind the furnace 5.

A conveyor 8-1 for feeding the cases extends along these devices. A conveyor 8-2 for returning the cases forms one pair with the conveyor 8-1. A case carrying device comprises these conveyors and case loading/unloading devices 11-1–11-3 and 14-1–14-3 provided at the compacting machines 4-1 to 4-3, sizing presses 6-1, 6-2 and the finishing device 7.

A first transfer unit 12 is provided between the entrance to the sintering furnace 5 and the conveyor 8-1 for feeding the cases. It includes a separating means 9 for removing the heat-resistant trays 1 from the corresponding carrier cases and placing them on the conveyor of the furnace. A second transfer unit 13 is provided between the outlet of the furnace 5 and the carrier conveyor 8-1. It includes a tray returning means 10 for placing the heat-resistant trays, which have been subjected to heat treatment, back onto the corresponding carrier cases.

We shall now describe the operation of the production facility shown in FIG. 2. Three different kinds of works to be heated under the same conditions are supplied from the respective compacting machines 4-1 to 4-3 and are put in the carrier cases 2 as shown in FIG. 1 together with the heat-resistant trays 1. The carrier cases 2 are then placed on the carrier conveyor 8-1 by means of the loading/unloading devices 11-1 to 11-3. Thus, the works are fed along the single common path. The works of different types are of course carried on different trays, When the carrier cases carried on the conveyor 8-1 and containing the works approach the sintering furnace 5, they are moved to the entrance to the furnace by means of the first transfer unit 12. At the same time, the heat-resistant trays 1 carrying the works are separated from the respective carrier cases 2 by means of the separating means 9 and put on the conveyor of the furnace, On the other hand, the empty carrier cases 2 are put back on the conveyor 8-1 by means of the transfer unit 12 and fed further ahead, keeping the direction of feed unchanged.

The empty cases 2 are then fed toward the outlet of furnace 5 by means of the second transfer unit 13. While the empty cases 2 are being fed ahead, the corresponding heat-resistant trays 1 carrying the works are fed through the furnace 5. The trays 1 thus subjected to heat treatment come out of the furnace 5 one after another and put back into the empty carrier cases 2 which have been brought to the outlet of the furnace, one after another by the tray returning means 10. The trays 1 are then put back on the carrier conveyor 8-1 together with the cases 2 and fed toward the post-treatment devices 7.

The loading/unloading devices 14-1 to 14-3 identify predetermined works according to the marks attached to the respective carrier cases 2 and unload these works together with the case 2. Then, the works are removed from the heat-resistant trays 1. The now empty trays 1, received in the respective carrier cases 2, are put on the return conveyor 8-2 and fed back toward the pre-treatment device 4. The loading/unloading devices 11-1 to 11-3 then unload predetermined carrier cases 2 from the conveyor and load the green compact on the heat-resistant trays 1 in the cases 2. The above operation is repeated.

The arrangement shown in FIG. 3 is especially useful where works are subjected to heat treatment under different conditions or where the compacting machine has an extremely high throughput capacity compared with that of the sintering furnace. As shown in FIG. 3, this facility has two sintering furnaces 5-1 and 5-2 (three or more furnaces may be used). The sintering furnace 5-2 has a conveyor 8-3 for feeding the carrier cases ahead.

There are provided two first transfer units 12-1 and 12-2 connecting the conveyor 8-1 with the entrance to the furnace 5-1 and connecting the conveyor 8-3 with the entrance to the furnace 5-2, respectively. Similarly, there are provided two second transfer units 13-1 and 13-2 extending between 8-1 and 5-1 and between 8-5 and 5-2, respectively, Further, upstream of the first transfer unit, there is provided a distributing device 15 connecting the conveyor 8-1 with 8-3. Downstream of the second transfer unit is provided a collecting device 16 connecting the conveyor belts 8-1 with 8-3.

In this arrangement, some of the carrier cases 2 fed on the conveyor 8-1 are transferred onto the conveyor 8-3 by the distributing device 15 and the carrier cases 2 containing the heat-treated heat-resistant trays 1 and fed on the conveyor 8-3 are transferred back onto the conveyor 8-1 by the collecting device 16. Thus, heat treatment can be carried out in a plurality of (two in the illustrated embodiment) sintering furnaces. This improves the productivity.

Figure 4:
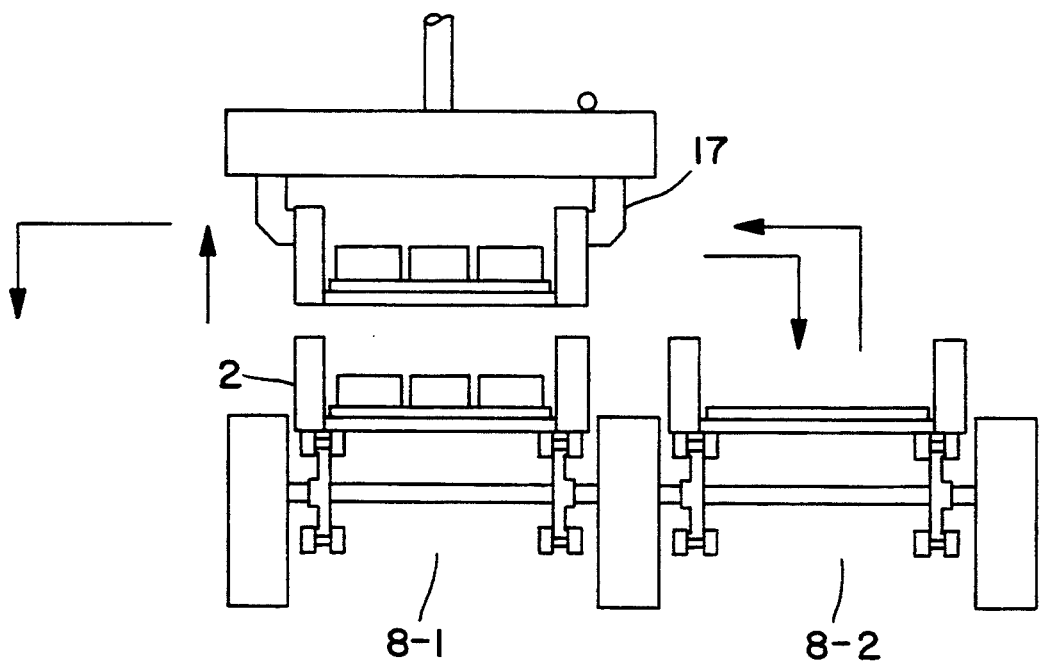
FIG. 4 is a plan view showing a loading/unloading device with a case stocker.
Figure 5:
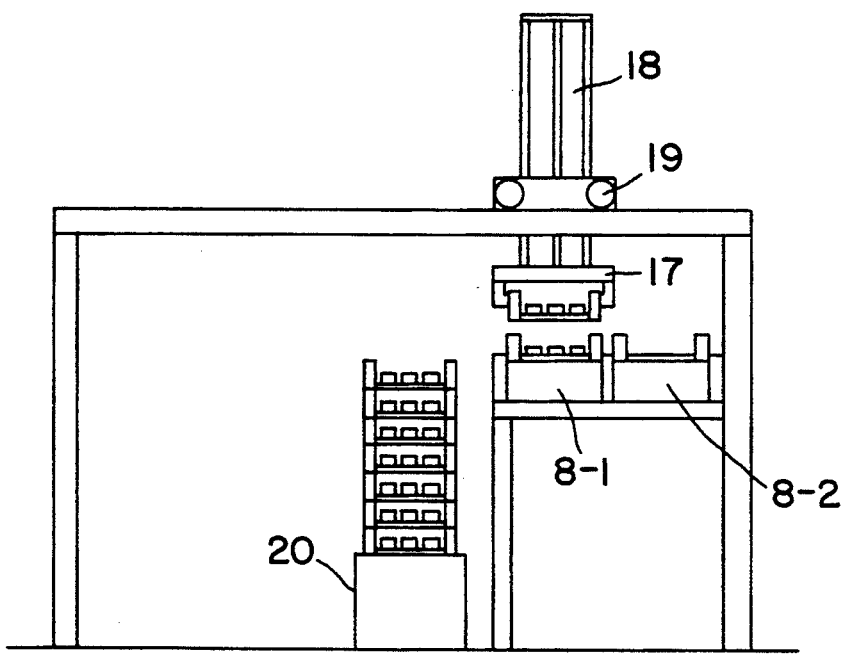
FIG. 5 is a view showing how the carrier case is moved from one position to another by the device shown in FIG. 4.

FIGS. 4 and 5 show schematically the loading/unloading devices 11 and 14. These devices each comprise a hand 17 for gripping and lifting carrier cases 2 and a lifting mechanism 18 for lifting the hand 17 and a mechanism 19 for moving the hand 17 and the lifting mechanism 18 horizontally and transversely of the conveyors. If the hands 17 have a sufficiently long vertical stroke, the conveyors can be provided overhead above the working area. This is desirable in that the working range will not be restricted by the carrier assembly. The distributing device 15 and the collecting device 16 may have similar structures.

The first and second transfer devices 12 and 13 may comprise a device similar to that shown in FIGS. 4 and 5 and the separating means 9 or the returning means 10. Such separating means 9 and returning means 10 may be of a type comprising a cylinder for pushing a corresponding heat-resistant tray out of or into the case with the carrier case stopped at a predetermined position.

Numeral 20 in FIG. 5 indicates a case stocker, Such a stocker 20 is provided near each of the loading/unloading devices 11 and 14 to store any oversupplied works therein together with their carrier cases and thus to adjust any imbalance in capacities between the adjacent steps. This eliminates the necessity of stopping the oversupplying side of the apparatus.

We compared the productivity of the method according to the present invention with that of a conventional method, A conventional method requires 24 people per line whereas the method according to the present invention requires only eight workers per line, This means that the method of the present invention can increase the per capita productivity to 300%.

Another advantage of the method of this invention is that the production time can be shortened dramatically. More specifically, the method of this invention makes it possible to finish a given work load in 15 hours while a conventional method required four full days to finish the same work load. This is because according to the present invention, the processing speed on the line is automatically adjustable according to the number of carrier cases in the line and all the steps are processed one after another in a single flow line. Further, since no human hands are necessary for the sintering of the green compacts the final products are virtually free of cracks, which were heretofore present at a low rate due to improper handling of the parts. Thus, the money lost due to defective parts can be reduced from an average of 0.5% of the total sales to about 0.1%.

INDUSTRIAL APPLICATION

According to the method of this invention, different kinds of works can be produced with automatic feeding between different stations and with little loss of thermal energy, using fewer number of heating devices than the pre-treatment and post-treatment devices. This method makes it possible to reduce the number of workers and increase the productivity, thus cutting down the production cost.

Also, sorting of the works are done with each tray in a batch, using the marks attached to the carrier cases, error-free sorting is possible. Also, since the sorting is carried out automatically, reject rate can be reduced dramatically compared with the conventional manual sorting. Thus the final products have high quality.

What is claimed is:

1. A method of producing different kinds of heated products using a facility comprising a heating device for heat treating works while feeding said works facility from entrance to facility outlet, a plurality of pre-treatment and post-treatment devices provided, respectively, upstream and downstream of said heating device, a case carrier device having a main carrier line extending along said heating device and said pre-treatment and post-treatment devices, a first transfer device provided between said carrier device and the entrance of said heating device, and a second transfer device provided between said carrier device and the outlet of said heating device.

said method comprising the steps of putting a plurality of kinds of works fed from said pre-treatment device in a plurality of heat-resistant trays with one tray carrying the same kind of works, setting said heat-resistant trays in carrier cases each having a marking for showing the kind of works carried by the respective tray, moving each carrier case by said carrier device to a point near said heating device, separating each heat-resistant tray from the respective carrier case by means of said first transfer device, feeding each tray into said heating device while moving said tray-free carrier cases toward said second transfer device by said carrier device, putting each heat-resistant tray coming out of said heating device back into said carrier case by said second transfer device, moving said carrier cases now carrying the trays further ahead by said carrier device, sorting said cases according to the markings on said cases, and feeding said cases thus sorted to said post-treatment device.

2. A method of producing different kinds of heated products as claimed in claim 1 wherein said facility further comprises another heating device having a second case carrier device and provided in parallel with said heating device to which said heat-resistant trays are fed by said main carrier line, another pair of first and second transfer devices similar to the first-mentioned first and second transfer devices and provided between said another heating device and said second case carrier device, a distributing device provided upstream of said first transfer device and a collecting device provided downstream of said second carrier device, said method further comprising the steps of moving some of said carrier cases fed on said main carrier line onto a carrier line of said second case carrier device by means of said distributing device, moving said part of said carrier cases fed on said second case carrier device back onto said main carrier line by means of said collecting device, and feeding said carrier cases to said post-treatment device.

3. A method of producing different kinds of heated products as claimed in claim 1 wherein said facility Further comprises a case stocker having means for moving cases and provided between said two carrier devices for storing any oversupplied works therein together with the respective carrier cases and heat-resistant trays.

4. A method of producing different kinds of heated products as claimed in claim 1 wherein said carrier device comprises a conveyor as the carrier line, said conveyor extending over said pre-treatment and post-treatment devices, and a loading device for moving the carrier cases between said pre-treatment and post-treatment devices and said overhead conveyor.

5. A method of producing different kinds of heated products as claimed in claim 2, wherein said carrier device comprises a conveyor as the carrier line, said conveyor extending over said pre-treatment and post-treatment devices, and a loading device for moving the carrier cases between said pre-treatment and post-treatment devices and said overhead conveyor.

6. A method of producing different kinds of heated products as claimed in claim 3 wherein said carrier device comprises a conveyor as the carrier line, said conveyor extending over said pre-treatment and post-treatment devices, and a loading device for moving the carrier cases between said pre-treatment and post-treatment devices and said overhead conveyor.

* * * * *